US012753348B2

(12) United States Patent
Hommeltoft

(10) Patent No.: US 12,753,348 B2
(45) Date of Patent: Oct. 6, 2026

(54) DOWNFLOW LIPID CONVERSION WITH UPFLOW CATALYST REGENERATION

(71) Applicant: CHEVRON U.S.A. INC., San Ramon, CA (US)

(72) Inventor: Sven Ivar Hommeltoft, Pleasant Hill, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 0 days.

(21) Appl. No.: 19/325,315

(22) Filed: Sep. 10, 2025

(65) Prior Publication Data

US 2026/0008023 A1 Jan. 8, 2026

Related U.S. Application Data

(62) Division of application No. 19/020,241, filed on Jan. 14, 2025, now Pat. No. 12,421,460.

(Continued)

(51) Int. Cl.

*C10G 3/00* (2006.01)
*B01J 8/02* (2006.01)

(Continued)

(52) U.S. Cl.

CPC .................. *C10G 3/44* (2013.01); *B01J 8/02* (2013.01); *B01J 8/025* (2013.01); *B01J 8/26* (2013.01);

(Continued)

(58) Field of Classification Search

CPC ..... B01J 8/00; B01J 8/02; B01J 8/0242; B01J 8/025; B01J 8/18; B01J 8/24; B01J 8/26;

(Continued)

(56) References Cited

U.S. PATENT DOCUMENTS 2,664,336 A 12/1953 Cornell
3,433,733 A 3/1969 Bunn, Jr. et al.

(Continued)

FOREIGN PATENT DOCUMENTS

CN 101314748 12/2008
CN 102786966 11/2012

(Continued)

OTHER PUBLICATIONS

FR 2991596 A1 with machine translation (Year: 2013).*

(Continued)

*Primary Examiner* — Natasha E Young

(74) *Attorney, Agent, or Firm* — Sheppard, Mullin, Richter & Hampton LLP

(57) ABSTRACT

A reactor system includes a reactor that treats a lipid feedstock using a metal oxide catalyst to produce a treated stream comprising a bio-oil. The reactor system includes a catalyst zone in which the metal oxide catalyst reacts with the lipid feedstock to produce the treated stream. The reactor system operates in a reaction mode, during which the lipid feedstock flows in a downward direction through the metal oxide catalyst to produce the treated stream. Alternately, the reactor also operates in a regeneration mode, during which coke is burned from the metal oxide catalyst thereby regenerating the metal oxide catalyst. In one aspect, a regeneration mode pressure is less than a reaction mode pressure within the reactor to fluidize the catalyst.

14 Claims, 2 Drawing Sheets

Related U.S. Application Data

(60) Provisional application No. 63/621,085, filed on Jan. 15, 2024.

(51) Int. Cl.
*B01J 8/26* (2006.01)
*B01J 38/00* (2006.01)
*C11C 1/00* (2006.01)
*C11C 1/08* (2006.01)

(52) U.S. Cl.
CPC ................ *C10G 3/60* (2013.01); *C10G 3/62* (2013.01); *C11C 1/002* (2013.01); *C11C 1/08* (2013.01); *B01J 38/00* (2013.01)

(58) Field of Classification Search
CPC ... B01J 38/00; C10G 3/00; C10G 3/42; C10G 3/44; C10G 3/60; C10G 3/62; C11C 1/00; C11C 1/002; C11C 1/08
See application file for complete search history.

(56) References Cited

U.S. PATENT DOCUMENTS

| | | | |
|---|---|---|---|
| 3,784,463 | A | 1/1974 | Reynolds et al. |
| 3,894,936 | A | 7/1975 | Hartley |
| 4,007,131 | A | 2/1977 | Gilespie |
| 4,645,585 | A | 2/1987 | White |
| 4,880,574 | A | 11/1989 | Welsh |
| 5,145,490 | A | 9/1992 | Sadowski |
| 6,187,465 | B1 | 2/2001 | Galloway |
| 7,998,339 | B2 | 8/2011 | Myllyoja et al. |
| 8,350,102 | B2 | 1/2013 | Roberts, IV et al. |
| 8,354,065 | B1 | 1/2013 | Sexton et al. |
| 9,580,657 | B2 | 2/2017 | Heydenrych et al. |
| 9,903,584 | B2 | 2/2018 | Fan et al. |
| 10,190,059 | B2 | 1/2019 | Chapus et al. |
| 10,479,943 | B1 | 11/2019 | Liu et al. |
| 10,947,458 | B1 | 3/2021 | Tengfei et al. |
| 11,479,725 | B2 | 10/2022 | Amblard et al. |
| 11,555,153 | B1 | 1/2023 | Hommeltoft |
| 11,912,947 | B1 | 2/2024 | Hommeltoft |
| 12,139,673 | B2 | 11/2024 | Andersson et al. |
| 12,319,878 | B2 | 6/2025 | Hommeltoft |
| 12,319,881 | B1 | 6/2025 | Han et al. |
| 12,421,460 | B2 | 9/2025 | Hommeltoft |
| 12,434,224 | B2 | 10/2025 | Hommeltoft |
| 2007/0161832 | A1 | 7/2007 | Myllyoja et al. |
| 2008/0053870 | A1 | 3/2008 | Marker |
| 2009/0000185 | A1 | 1/2009 | Aulich et al. |
| 2009/0158637 | A1 | 6/2009 | McCall et al. |
| 2009/0300970 | A1 | 12/2009 | Perego |
| 2010/0043278 | A1 | 2/2010 | Brevoord |
| 2010/0163395 | A1 | 7/2010 | Henrich |
| 2011/0021857 | A1 | 1/2011 | Cao |
| 2011/0054230 | A1 | 3/2011 | Cole et al. |
| 2011/0056869 | A1 | 3/2011 | Novak et al. |
| 2011/0196113 | A1 | 8/2011 | Nesterenko |
| 2011/0237853 | A1 | 9/2011 | Hamamatsu et al. |
| 2012/0137572 | A1 | 6/2012 | Bartek et al. |
| 2012/0160741 | A1 | 6/2012 | Gong et al. |
| 2012/0203042 | A1 | 8/2012 | Huber et al. |
| 2012/0238787 | A1 | 9/2012 | Gruber et al. |
| 2012/0244585 | A1 | 9/2012 | Kale et al. |
| 2012/0251424 | A1 | 10/2012 | Havlik et al. |
| 2012/0258021 | A1 | 10/2012 | Badger |
| 2012/0316093 | A1 | 12/2012 | Zhan et al. |
| 2013/0006028 | A1 | 1/2013 | Chaogang et al. |
| 2013/0025187 | A1 | 1/2013 | Kocal et al. |
| 2013/0338409 | A1 | 12/2013 | Trewalla et al. |
| 2013/0338418 | A1 | 12/2013 | Xu |
| 2014/0012025 | A1 | 1/2014 | Sohling et al. |
| 2014/0109464 | A1 | 4/2014 | Powell et al. |
| 2014/0123973 | A1 | 5/2014 | North |
| 2014/0148609 | A1 | 5/2014 | Roussis et al. |
| 2014/0163285 | A1 | 6/2014 | Buchanan et al. |
| 2014/0171700 | A1 | 6/2014 | Roberts |
| 2015/0051428 | A1 | 2/2015 | Dayton |
| 2015/0087861 | A1 | 3/2015 | Devaux et al. |
| 2015/0141703 | A1 | 5/2015 | Dubois |
| 2015/0259202 | A1 | 9/2015 | Dybkj |
| 2017/0183581 | A1 | 6/2017 | Ladkat |
| 2018/0170824 | A1 | 6/2018 | Sreekumar |
| 2018/0258349 | A1 | 9/2018 | Heydenrych |
| 2019/0185759 | A1 | 6/2019 | Kanervo et al. |
| 2019/0299195 | A1 | 10/2019 | Nakazawa |
| 2020/0017772 | A1 | 1/2020 | Ramamurthy |
| 2021/0179952 | A1 | 6/2021 | Tsuto et al. |
| 2021/0380885 | A1 | 12/2021 | Mills |
| 2022/0041938 | A1 | 2/2022 | Hommeltoft |
| 2022/0048833 | A1 | 2/2022 | Drobyshev |
| 2022/0049172 | A1 | 2/2022 | Tiitta et al. |
| 2022/0119328 | A1 | 4/2022 | Schroer |
| 2022/0145199 | A1 | 5/2022 | Kuo |
| 2022/0403252 | A1 | 12/2022 | Vilja et al. |
| 2023/0098592 | A1 | 3/2023 | Novak |
| 2023/0234843 | A1 | 7/2023 | Hobby |
| 2023/0357106 | A1 | 11/2023 | Missalla et al. |
| 2024/0018419 | A1 | 1/2024 | Huizenga |
| 2024/0157320 | A1 | 5/2024 | Song et al. |
| 2024/0157347 | A1 | 5/2024 | Hommeltoft |
| 2024/0218261 | A1 | 7/2024 | Hommeltoft |
| 2024/0253028 | A1 | 8/2024 | Zhang |
| 2024/0425764 | A1 | 12/2024 | Hommeltoft |
| 2025/0027000 | A1 | 1/2025 | Hommeltoft |
| 2025/0333656 | A1 | 10/2025 | Hommeltoft |
| 2026/0015547 | A1 | 1/2026 | Hommeltoft |

FOREIGN PATENT DOCUMENTS

| | | | |
|---|---|---|---|
| EP | 2141217 | B1 | 3/2015 |
| EP | 4372069 | A1 | 5/2024 |
| FI | 20205954 | A1 | 3/2022 |
| FI | 20225933 | A1 | 4/2024 |
| WO | 2008/152199 | | 12/2008 |
| WO | 2009/130392 | | 10/2009 |
| WO | 2010071677 | | 6/2010 |
| WO | 2014/089131 | | 6/2014 |
| WO | 2015/148412 | | 10/2015 |
| WO | 2022221840 | | 10/2022 |
| WO | 2023/066738 | | 4/2023 |
| WO | 2023088772 | | 5/2023 |
| WO | 2024006239 | | 1/2024 |

OTHER PUBLICATIONS

Gibon et al., "Palm oil refining," Eur. J. Lipid. Sci. Technol. 109 (2007), 315-335.

Glowka et al., "Sustainable aviation fuel—Comprehensive study on highly selective isomerization route towards HEFA based bioadditives," Renewable Energy 220 (2024), 9 pages.

Huber et al., "Synthesis of Transportation Fuels from Biomass: Chemistry, Catalysts, and Engineering," Chem. Rev. (2006), 106, 4044-4098.

Mu et al., "Optimum design of radial flow moving-bed reactors based on a mathematical hydrodynamic model," Chemical Engineering and Processing 42 (2003), pp. 409-417.

Renz, "Ketonization of Carboxylic Acids by Decarbooxylation: Mechanism and Scope," Eur. J. Org. Chem. 2005, 979-988.

Shirzad et al., "Moving Bed Reactors: Challenges and Progress of Experimental and Theoretical Studies in a Century of Research," Ind. Eng. Chem. Res. 58 (2019), pp. 9179-9198.

Zabeti et al., "Biodiesel production using alumina-supported calcium-oxide: An optimization study," Fuel Processing Technology 91 (2010) 243-248.

Chen et al., "Catalytic fast pyrolysis of biomass: Selective deoxygenation to balance the quality and yield of bio-oil," Bioresource Technol., 273, pp. 153-158, 2019.

Chen et al., "Recent developments in ignocellulosic biomass catalytic fast pyrolysis: Strategies for the optimization of bio-oil quality and yield," Fuel Process Technol., 196, 106180, 2019.

(56) References Cited

OTHER PUBLICATIONS

Han et al., Advancing the application of bio-oils by co-processing with petroleum intermediates: A review, Energy Conversion and Management, 2021.
Liang et al., “Catalytic fast pyrolysis of lignocellulosic biomass: Critical role of zeolite catalysts,” Renew. Sust. Energ. Rev., 139, 110707, 2021.
Zhang et al., “Superheated steam as carrier gas and the sole heat source to enhance biomass torrefaction,” Bioresource Technology, 2021.
Zhou et al., “Catalytic conversion of lignocellulosic biomass to fine chemicals and fuels,” Chem. Soc. Rev. 40, pp. 5588-5617, 2011.
Li et al., “Applications of calcium oxide-based catalyst in biomass pyrolysis/gasification—A review,” Journal of Cleaner Production, 291, pp. 1-12, 2021.
Thangadurai et al., “Acidity and basicity of metal oxide based catalysts in catalytic cracking of vegetable oil,” Brazilian Journal of Chemical Engineering, 38:1-20, 2021.
Mansir et al., “Catalytically active metal oxides studies for the conversion technology of carboxylic acids and bioresource based fatty acids to ketones: A review,” Bioresource Technology Reports 17 (2022) 100988.

* cited by examiner

DOWNFLOW LIPID CONVERSION WITH UPFLOW CATALYST REGENERATION

CROSS-REFERENCE TO RELATED APPLICATIONS

This application is a divisional of U.S. patent application Ser. No. 19/020,241, now U.S. U.S. Pat. No. 12,421,465, filed Jan. 14, 2025, which claims the benefit of U.S. Provisional Patent Application No. 63/621,085, filed Jan. 15, 2024 and entitled "Downflow Lipid Conversion with Upflow Catalyst Regeneration," the entire contents of which are incorporated by reference herein.

TECHNICAL FIELD

Embodiments of the technology relate generally to upgrading compositions that may be used as renewable feedstocks for refinery processing and regeneration of catalysts used in such upgrading.

BACKGROUND

There is an increasing interest in alternative feedstocks for replacing at least partly crude oil, in the production of hydrocarbons, suitable as fuels or fuel components, for example as transportation fuels, or compatible with fuels. Biofuels are typically manufactured from feedstock originating from renewable sources including oils and fats obtained from plants, animals, algal materials, fish, and various waste streams, side streams and sewage sludge. These feedstocks, particularly the various waste streams and side streams, contain varying amounts of contaminants, such as gums, organic chlorine compounds, phospholipids and other phosphorus compounds, metals and metal compounds, and residual soaps, which are, for example, deleterious to converting catalysts.

Despite the ongoing research and development in the processing of renewable feedstocks and manufacture of fuels, there is still a need to provide an improved process for purifying renewable feedstock to provide purified feedstock, which is suitable for converting to valuable chemicals, such as hydrocarbons suitable as fuels or fuel blending components. In particular, there is a need for reactor systems that can efficiently process such alternative and renewable feedstocks. More specifically, there is a need for reactor systems that can minimize the risk of plugging caused by accumulated deposits and minimize the risk of non-uniform flows caused by channeling during one or both of a reaction mode and a regeneration mode of the reactor system.

SUMMARY

In one example embodiment, the present disclosure is generally directed to a process for treating a lipid feedstock comprising treating the lipid feedstock to produce a treated stream that comprises a condensable oil fraction having a lower content of oxygen and impurities than the lipid feedstock. The process can comprise alternating an operation of a reactor between a reaction mode and a regeneration mode. The reaction mode can comprise: (a) providing an input of the lipid feedstock into a top portion of the reactor such that the lipid feedstock flows downward through a bed of catalyst particles comprising a metal oxide on an oxide support; (b) operating the reactor at a reaction mode temperature of from 450° C. to 550° C. and a reaction mode pressure of from 30 psi to 1,450 psi; and (c) withdrawing the treated stream from the bottom portion of the reactor. At a certain point in time, the operation of the reactor in the reaction mode can be discontinued and the operation of the reactor in the regeneration mode can commence. The regeneration mode can comprise: (a) providing an input of air optionally diluted with steam or inert gas into a bottom portion of the reactor such that the air flows upward through the catalyst particles; (b) maintaining a temperature of 400° C. to 800° C., thereby causing combustion of combustible solids on the catalyst particles and thereby regenerating the catalyst particles; and (c) withdrawing a flue gas from the top portion of the reactor wherein the flue gas comprises dust particles derived from the impurities in the lipid feedstock.

In another example embodiment, the present disclosure is generally directed to a reactor system for treating a lipid feedstock. The reactor system can treat the lipid feedstock to produce a treated stream that comprises a condensable oil fraction having a lower content of oxygen and impurities than the lipid feedstock, wherein the reactor system operates alternating between a reaction mode and a regeneration mode. The reactor system can comprise: (a) a reactor having a top portion and a bottom portion and configured to contain at least one bed of catalyst particles comprising a metal oxide on an oxide support; (b) a lipid feedstock inlet in the top portion of the reactor for feeding a lipid feedstock in a downward flow and an outlet in the bottom portion of the reactor for removing the treated stream when operating in the reaction mode; (c) a temperature control for operating the reactor at a reaction mode temperature of from 450° C. to 550° C. and a regeneration mode temperature of 400° C. to 800° C., the regeneration mode temperature causing combustion of combustible solids on the catalyst particles thereby regenerating the catalyst particles; (d) a pressure control for operating the reactor at a reaction mode pressure of from 30 psi to 1,450 psi and a regeneration mode pressure of from 10 psi to 200 psi; (e) an inlet in the bottom portion of the reactor for providing air in an upward flow; and (f) an outlet in the top portion of the reactor for removing flue gas from the combustion when operating in the regeneration mode.

The foregoing embodiments are non-limiting examples and other aspects and embodiments will be described herein. The foregoing summary is provided to introduce various concepts in a simplified form that are further described below in the detailed description. This summary is not intended to identify required or essential features of the claimed subject matter nor is the summary intended to limit the scope of the claimed subject matter.

BRIEF DESCRIPTION OF THE DRAWINGS

The accompanying drawings illustrate only example embodiments of a reactor system and a method for processing a lipid feedstock and therefore are not to be considered limiting of the scope of this disclosure. The principles illustrated in the example embodiments of the drawings can be applied to alternate methods and apparatus. Additionally, the elements and features shown in the drawings are not necessarily to scale, emphasis instead being placed upon clearly illustrating the principles of the example embodiments. Certain dimensions or positions may be exaggerated to help visually convey such principles. In the drawings, the same reference numerals used in different embodiments designate like or corresponding, but not necessarily identical, elements.

DETAILED DESCRIPTION OF EXAMPLE EMBODIMENTS

The example embodiments discussed herein are directed to apparatus and methods for processing a lipid feedstock. The example apparatus and methods described herein are particularly beneficial in the oil and gas industry where lipid feedstocks can be used in the production of hydrocarbon fluids. As will be described further below, the apparatus and methods described herein utilize a reactor system comprising one or more reactors for treating lipid feedstocks to produce a bio-oil renewable feedstock suitable for refinery operations.

One of the challenges associated with the reactors used to treat lipid feedstocks is the accumulation of coke and non-volatile impurities within the reactor bed and on the catalyst therein. The accumulation of coke and non-volatile impurities within the reactor can cause plugging of the reactor which inhibits the treatment of the lipid feedstocks and the production of the reactor system. The accumulation of coke and non-volatile impurities within the reactor also can cause channeling within the reactor whereby material in the catalyst bed becomes unevenly distributed due to the accumulated deposits causing fluid flows through the reactor to become non-uniform and degrading the performance of the reactor system.

Figures 1, 2:
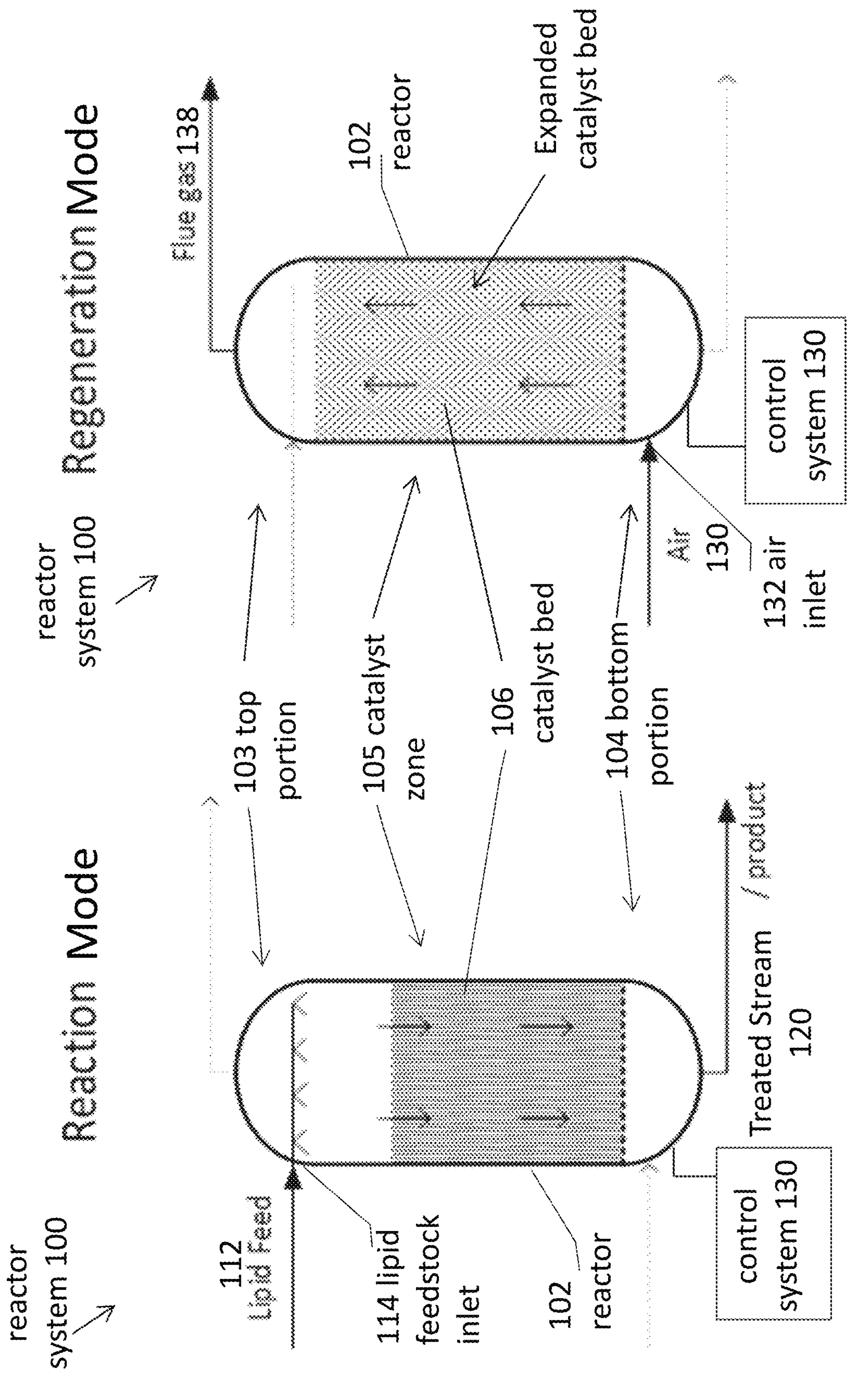
FIG. 1 illustrates a reactor system operating in a reaction mode in accordance with an example embodiment of the disclosure.
FIG. 2 illustrates the reactor system of FIG. 1 operating in a regeneration mode in accordance with an example embodiment of the disclosure.

As explained further below, the example embodiments described herein provide techniques for inhibiting the occurrence of plugging and channeling in the one or more reactors of the example reactor systems. FIGS. 1 and 2 illustrate a reactor system operating first in a reaction mode and second in a regeneration mode. While only a single reactor is illustrated in FIGS. 1 and 2, in alternate embodiments multiple reactors can be operated in parallel with certain reactors operating in the reaction mode while other reactors are operating the regeneration mode and vice versa. The example embodiment of FIG. 3 describes the process by which the reactor system operates in an alternating manner in the reaction and regeneration modes. As will be described further below, in the reaction mode, the reactor operates in a downflow direction with the lipid feedstock flowing downward through the reactor. In contrast, in the regeneration mode, the reactor operates in an upflow direction with air entering at the bottom of the reactor and flowing upward with combustion gases generated during the regeneration. The alternating operating modes of the reactor inhibit plugging and channeling within the reactor thereby improving the performance of the reactor. Further details of these example embodiments will be elucidated in the descriptions that follow.

In the following paragraphs, particular embodiments will be described in further detail by way of example with reference to the drawings. In the description, well-known components, methods, and/or processing techniques are omitted or briefly described. Furthermore, reference to various feature(s) of the embodiments is not to suggest that all embodiments must include the referenced feature(s).

DEFINITIONS

The term "lipid" is known in the art and refers to fatty acids and their derivatives. Accordingly, examples of lipids include fatty acids (both saturated and unsaturated); glycerides or glycerolipids, also referred to as acylglycerols (such as monoglycerides (monoacylgycerols), diglycerides (diacylglycerols), triglycerides (triacylglycerols, TAGs, or neutral fats); phosphoglycerides (glycerophospholipids); nonglycerides (sphingolipids, sterol lipids, including cholesterol and steroid hormones, prenol lipids including terpenoids, fatty alcohols, waxes, and polyketides); and complex lipid derivatives (sugar-linked lipids or glycolipids, and protein-linked lipids).

The term "fatty acid" refers to a monocarboxylic acid having an aliphatic chain containing 3 to 39 carbon atoms, more particularly 7 to 23 carbon atoms. The aliphatic chain may be linear or branched and may be saturated or unsaturated (e.g., contain one or more carbon-carbon double bonds).

The term "bio-oil" means a liquid product produced from biomass by a thermochemical process. Bio-oil may include bio-derived hydrocarbon fractions and oxygenated hydrocarbons such as carboxylic acids, alcohols, aldehydes, ketones, etc.

The term "pyrolysis" refers to the thermal decomposition of organic materials in an oxygen-lean atmosphere (i.e., significantly less oxygen than required for complete combustion). The term "ketopyrolysis" refers to a combined ketonization and pyrolysis process as described further below.

The term "hydroprocessing" generally encompasses all processes in which a hydrocarbon feedstock is reacted with hydrogen in the presence of a catalyst and under hydroprocessing conditions, typically, at elevated temperature and elevated pressure. Hydroprocessing includes, but is not limited to, processes such as hydrogenation, hydrodeoxygenation, hydrodesulfurization, hydrodenitrogenation, hydrodemetallization, hydrodearomatization, hydroisomerization, hydrodewaxing, hydrocracking and mild hydrocracking.

The term "transportation fuels" refer here to fractions or cuts or blends of hydrocarbons having distillation curves standardized for fuels, such as for diesel fuel (middle distillate from 160° C. to 380° C., according to EN 590), gasoline (40° C. to 210° C., according to EN 228), aviation fuel (160° C. to 300° C., according to ASTM D-1655 jet fuel), kerosene, naphtha, etc. Liquid fuels are hydrocarbons having distillation curves standardized for fuels, such as transportation fuels.

The term "ppm" means parts-per-million and is a weight relative parameter. A part-per-million is a microgram per gram, such that a component that is present at 10 ppm is present at 10 micrograms of the specific component per 1 gram of the aggregate mixture.

Lipid Feedstock

The lipid feedstocks described herein originate from a renewable or biological source or sources, and the lipid feedstocks are meant to include here feedstocks other than those obtained from mineral oil, shale oil, or coal.

The lipid feedstock may for example comprise 0 to 90 wt. % of free fatty acids, 5 to 100 wt. % fatty acid glycerol esters (e.g., mono-, di-, triglycerides) and 0 to 20 wt. % of one or more compounds selected from the list consisting of: fatty acid esters of the non-glycerol type, fatty amides, and fatty alcohols, where the renewable feedstock comprises more than 50 wt. % of free fatty acids and fatty acid glycerol esters such as 70 wt. % or more, for example 80 wt. % or more.

The lipid feedstock may originate for example from plants, animals, algae (algae oil, algae biomass, algae cultivation), fish and microbiological processes.

Examples of such feedstocks include feedstocks originating from low value renewable waste materials, side streams, by-products, refining waste and residues, sewage sludge, and any combinations thereof.

The lipid feedstock may be selected from the group consisting of acidulated soap-stocks, fatty acid distillates from physical refining of plant oils or animal fats, distillers corn oil (DCO) from ethanol production, waste cooking oils, lard, brown grease, yellow grease, trap grease, waste fats, low-grade oils, supercritical water liquefaction oils (SCWL oils), plant oils, animal fats and any combination thereof.

Such lipid feedstocks typically contain varying amounts of impurities, such as phosphorus, silicon, chloride, alkali metals, earth alkaline metals, other metals, etc.

The lipid feedstock may comprise at least 10 ppm (e.g., 10 to 100 ppm, 10 to 75 ppm, 10 to 50 ppm, 15 to 100 ppm, or 15 to 50 ppm) of chlorine, calculated as elemental chlorine (a Cl atom). Chlorine content can be determined using combustion ion chromatography (CIC). Combustion ion chromatography is a technique in which a sample is burned in oxygen-containing gas flow, the gas generated is absorbed in an adsorption solution and then, a halogen ion adsorbed in the adsorption solution is quantitatively analyzed by an ion chromatography method. The technique makes it possible to easily analyze a halogen component in ppm range which has been conventionally difficult.

Lipid feedstocks comprising one or more of alkali metals, alkaline earth metals, and/or other metals, such as iron and manganese, even in low amounts are often regarded as not suitable for catalytic treatment in refinery operations because each of the metals is an effective catalyst poison. The alkali metals, alkaline earth metals and other metals may typically comprise Na, K, Mg, Ca, Mn, Fe, or a combination thereof.

The lipid feedstock may comprise at least 1 ppm (e.g., 1 to 250 ppm, 1 to 100 ppm, 1 to 50 ppm, 1 to 25 ppm, 2 to 250 ppm, 2 to 100 ppm, or 2 to 25 ppm) of alkali metals, alkaline earth metals, metals of Groups VIIB and VIIIB, or combinations thereof, calculated as elemental metals, in total. Total metals content can be determined using AOCS Recommended Practice Ca 17-01.

Low value lipid feedstocks, such as various types of animal fats and waste oils, generally have a relatively high concentration of free fatty acids. One method of assessing the concentration of free fatty acids is to determine the total acid number (TAN) of the feedstock. The total acid number is the mass of potassium hydroxide (KOH) in milligrams that is required to neutralize one gram of the chemical substance being assessed.

The lipid feedstock may have an acid number of at least 5 mg KOH/g (e.g., 5 to 150 mg KOH/g, 10 to 150 mg KOH/g, 10 to 100 mg KOH/g, 10 to 50 mg KOH/g, from 10 to 25 mg KOH/g, or 10 to 20 mg KOH/g). Acid number can be determined using ASTM D664.

The lipid feedstock may be pretreated. Such pretreatments include, but are not limited to, degumming, neutralization, bleaching, deodorizing, or any combination thereof.

Treatment of the Lipid Feedstock

In order to provide renewable feedstocks suitable for refinery operations, the lipid feedstock is treated with a metal oxide catalyst on an oxide support under treating conditions to produce a treated stream comprising a liquid fraction comprising a bio-oil which has a lower content of free fatty acids and impurities as compared to the renewable feedstock. The obtained bio-oil is particularly suitable as a renewable feedstock for hydroprocessing in biofuel manufacture.

Without being bound by theory, the treating is believed to proceed by a thermochemical process which includes one of more of cracking, decarboxylation, decarboxylation-coupling, dehydration and/or deoxygenation reactions.

Suitable treating conditions may comprise one or more of the following: a temperature in a range of from 400° C. to 700° C. (e.g., 425° C. to 650° C., or 450° C. to 600° C.); a pressure in a range of from 0 to 1,450 psi (0 to 10 MPa) (e.g., 14 to 725 psi (0.1 to 5 MPa), or 14 to 145 psi (0.1 to 1 MPa)); and a liquid hourly space velocity (LHSV) in a range of from 0.1 to 10 $h^{-1}$ (e.g., 0.2 to 5 $h^{-1}$, or 0.3 to 3 $h^{-1}$).

The reaction may be carried out in the presence of a carrier gas comprising hydrogen, nitrogen, carbon dioxide, $H_2O$ (water vapor) or C1-C4 hydrocarbons (e.g., methane, ethane, propane or mixtures thereof), preferably, $CO_2$ or $H_2O$. These gases may be admixed into the reaction mixture and/or may be formed in the course of the reaction. The carrier gas may be used to expel gaseous or volatile reaction products from the product mixture such as $H_2O$ or $CO_2$.

The reaction is carried out in the presence of a metal oxide catalyst on an oxide support. The metal of the metal oxide may be selected from Na, K, Mg, Ca, Sr, Cr, Mo, Mn, Fe, Co, Ni, Cu, Zn, Al, rare earth metals, or a mixture thereof. The oxide support may be selected from alumina, silica, silica-alumina, titania, zirconia, or a mixture thereof. In some aspects, the metal oxide catalyst comprises CaO, the oxide support being alumina.

The bio-oil has a lower content of oxygen and impurities as compared to the lipid feedstock.

The bio-oil may have a TAN of less than 5 mg KOH/g (e.g., less than 4 mg KOH/g, less than 3 mg KOH/g, less than 2 mg KOH/g, or less than 1 mg KOH/g).

The bio-oil may comprise less than 10 ppm (e.g., less than 5 ppm, less than 1 ppm, or less than 0.5 ppm) of chlorine, calculated as elemental chlorine (a Cl atom).

The bio-oil may comprise less than 1 ppm of alkali metals, alkaline earth metals, metals of the Groups VIIB and VIIIB of the Periodic Table of Elements (other metals), or combinations thereof, calculated as elemental metals, in total, preferably less than 0.5 ppm.

The oxygen content of the bio-oil may be 5 wt. % or less (e.g., 3 wt. % or less, or 2 wt. % or less), on a dry basis, based on the total weight of the bio-oil. Oxygen content can be determined using ASTM D5291. Lipid feedstocks can have an oxygen content in a range of about 10 to 15 wt. %, on a dry basis, based on the total weight of the feedstock.

Hydroprocessing

Beneficially, the bio-oil produced by the process disclosed herein may be used directly as a refinery feedstock.

The obtained bio-oil may be blended with one or more mineral oil feedstocks originating from crude oil, shale oil or coal and likewise used as a refinery feedstock.

If desired, the bio-oil may be subjected to a catalytic hydroprocessing step. The obtained at least one effluent (hydroprocessing product) may be fractionated in a fractionating step to provide hydrocarbon fractions, suitable as renewable fuels or fuel components, useful as transportation fuels, fuel components and other chemicals.

The catalytic hydroprocessing step may be carried out in one step or in more than one steps.

The catalytic hydroprocessing step may be carried out by processing one or more fractions (such as distillation cuts) of the bio-oil separately or the bio-oil may be processed as a whole.

The catalytic hydroprocessing may comprise at least a hydrodeoxygenation step. Catalytic hydroprocessing may comprise a hydrodeoxygenation step followed by one or more steps selected from hydroisomerization and hydrocracking steps.

Hydroprocessing may be performed using one or more hydroprocessing catalysts comprising one or more metals selected from Group VIA and Group VIII metals. Particularly useful examples are Mo, W, Co, Ni, Pt and Pd. The catalyst(s) can also contain one or more support materials, for example zeolite, alumina, alumina-silica, zirconia, alumina-silica-zeolite and activated carbon. Suitably a mixture of CoO and $MoO_3$ (CoMo) and/or a mixture of NiO and $MoO_3$ (NiMo), and/or a mixture of Ni, Mo and Co and/or NiW and one or more support materials selected from zeolite, alumina, silica, zeolite-alumina, alumina-silica, alumina-silica-zeolite and activated carbon. Also, noble metals, such as Pt and/or Pd dispersed on alumina may be used.

Hydroprocessing conditions can include a temperature of from 100° C. to 450° C. (e.g., 200° C. to 370° C., or 230° C. to 350° C.); a pressure of from 72 to 4,350 psi (0.5 to 30 MPa) (e.g., 435 to 3,620 psi (3 to 25 MPa), or 435 to 1,740 psi (3 to 12 MPa)); a liquid hourly space velocity of from 0.01 to 10 $h^{-1}$ (e.g., 0.1 to 5 $h^{-1}$). The hydrogen gas treat rate can be in a range of from 600 to 4000 $Nm^3/m^3$ (e.g., 1300 to 2200 $Nm^3/m^3$).

The hydroprocessing occurs in a reaction stage. The reaction stage can comprise one or more reactors or reaction zones each of which comprises one or more catalyst beds of the same or different catalyst. Types of catalyst beds can include one or more of fixed beds, fluidized beds, ebullating beds, slurry beds, and moving beds. Interstage cooling or heating between reactors, reaction zones, or between catalyst beds in the same reactor, can be employed.

At least one effluent from the hydroprocessing is drawn off from the last reactor. In one embodiment, the effluent is directed to a separator, such as any suitable separator or flashing unit. In the separator, typically water, gaseous stream comprising hydrogen, light hydrocarbons (e.g., C1-C5 hydrocarbons), $H_2S$, CO and $CO_2$ are separated from the liquid component comprising >C5 hydrocarbons and some C1-C5 hydrocarbons. Water and gases may also be separated by other means which are well known to those skilled in the art.

The liquid hydrocarbon stream obtained from the hydroprocessing step includes fuel grade hydrocarbons having a boiling point of at most 380° C., according to ISO EN 3405. The person skilled in the art is able to vary the distilling conditions and to change the temperature cut point as desired to obtain any suitable hydrocarbon product, boiling suitably in the transportation fuel ranges.

EXAMPLES

The following illustrative examples are intended to be non-limiting.

The Reactor System

As described above, in order to provide renewable feedstocks of bio-oils suitable for refinery operations, the lipid feedstock is treated with a metal oxide catalyst to produce a treated stream. The treated stream comprises a condensable oil fraction that can be condensed and fractionated into a gas fraction and a liquid fraction, wherein the liquid fraction comprises water and a bio-oil suitable for use as a renewable feedstock for hydroprocessing. Example reactor systems for treating lipid feedstocks will now be described in greater detail.

FIGS. 1 and 2 illustrate one example reactor system in accordance with embodiments of the present disclosure. It should be understood that the example embodiments described herein can be applied to other types of reactor systems as well.

FIGS. 1 and 2 illustrate certain components associated with a reactor system 100. Reactor system 100 can be used to treat a lipid feedstock and produce a bio-oil renewable feedstock that is suitable for processing in a refinery for the ultimate production of transportation fuels. The reactor 102 of the reactor system 100 can be operated in two alternating modes—a reaction mode and a regeneration mode. The reactor 102 comprises a top portion 103, a bottom portion 104, and at least one catalyst zone 105. The catalyst zone 105 comprises metal oxide catalyst particles that form a catalyst bed 106. The metal oxide catalyst particles may be consistent with the example metal oxide catalysts described previously. In certain embodiments, the reaction that the lipid feedstock undergoes in the catalyst zone 105 may be described as a ketopyrolysis reaction, wherein the lipid feedstock undergoes both ketonization and pyrolysis.

As further illustrated in FIGS. 1 and 2, the reactor 102 comprises a lipid feedstock inlet 114 at which a lipid feedstock 112 flows into the reactor 102 during the reaction mode. In certain examples, a distributor tray within the reactor 102 may distribute the lipid feedstock 112 across the reactor 102. When operating in the reaction mode illustrated in FIG. 1, the lipid feedstock 112 flows downward through the reactor 102 and is treated by the catalyst bed 106 producing a treated stream 120 that exits the reactor 102 through an outlet at the bottom portion 104 of the reactor 102.

Also located at the bottom portion 104 of the reactor 102 is an air inlet 132 through which air 130 flows into the reactor 102 when operating in the regeneration mode. When the reactor is operating in the regeneration mode, combustion occurs generating a flue gas. The flue gas flows upward through the reactor 102 and exits through a flue gas outlet.

As referenced previously, the reactor 102 can operate alternately in a reaction mode and in a regeneration mode and the operation of the modes can be governed by control system 130. In addition to controlling the operating modes of the reactor, the control system 130 can include a temperature controller and a pressure controller for managing temperature and pressure conditions within the reactor. As illustrated in FIG. 1, when operating in the reaction mode, the reactor operates in a downflow direction with the lipid feedstock 112 flowing into the reactor 102 and downward through the catalyst bed 106. The lipid feedstock 112 is treated with the metal oxide catalyst in the catalyst bed 106, producing a treated stream 120 that is emitted from an outlet proximate to the top of the fixed bed reactor 102. As illustrative ranges, during the reaction mode, the control system 130 may maintain conditions within the reactor whereby a reaction mode temperature within the reactor is in a range of from 450° C. to 550° C. and a reaction mode pressure within the reactor is in a range from 30 psi to 1,450 psi. In a more specific embodiment, the control system 130 may maintain the reaction mode pressure within the reactor in a range of 100 psi to 500 psi. Reaction mode pressure refers to the pressure at the top portion 103 of the reactor 102 proximate the lipid feedstock inlet 114. Those of skill in this field will understand that the pressure within the reactor will drop as the lipid feedstock flows downward through the catalyst bed 106. Operating the reactor system 102 in the reaction mode in a downflow direction within the specified pressure ranges can assist in reducing plugging and channeling within the catalyst bed.

Over time, the reaction occurring in the catalyst zone 105 causes coke and impurities to build up on the metal oxide catalyst. The coke and impurities should be periodically removed from the metal oxide catalyst in order for the reactor to operate properly. Accordingly, during certain times, the control system 130 switches the reactor 102 from the reaction mode to the regeneration mode.

As illustrated in FIG. 2, during the regeneration mode, the lipid feedstock inlet 114 is turned off so that the lipid feedstock 112 does not flow into the reactor 102. Additionally, during the regeneration mode, the air inlet 132 located at the bottom portion 104 of the reactor provides air to the reactor 102 stimulating a combustion process within the catalyst zone 105. In certain examples, the air entering the reactor 102 at the air inlet 132 may be combined with steam or an inert gas. The regeneration mode operates in an upflow direction with the air flowing upward through the reactor 102. As the air is flowing upward, combustion occurs within the catalyst zone 105 which burns the coke from the metal oxide catalyst thereby regenerating the metal oxide catalyst.

Additionally, as further illustrated in FIG. 2, as the air flows upward through the reactor 102, it may expand the catalyst bed 106. The expansion of the catalyst bed promotes the removal of particles of impurities from the catalyst bed 106 so they can be carried away by flue gas. By expanding the catalyst bed, an upflow of air during the regeneration mode assists in minimizing plugging and channeling within the catalyst bed. Adjusting the air flow 130 up through the reactor can control whether the catalyst bed is expanded. In certain embodiments, the air flow 130 may be limited such that the catalyst bed remains fixed. Whereas, in other embodiments the air flow 130 may be increased to expand the catalyst bed. As an example, for a catalyst bed comprising 3 mm catalyst particles, the air flow flux through the catalyst bed may be in a range of 0.1 to 10 $m^3$ of air per $m^2$ of reactor cross section per second. At the lower end of that air flow flux range, the catalyst bed will remain fixed, whereas, at the upper end of that air flow flux range, the catalyst bed will expand or fluidize.

Accordingly, in one preferred embodiment, the reactor system is operated as a downflow fixed bed reactor during the reaction mode and as an upflow fluidized bed reactor during the regeneration mode. However, in another embodiment, the reactor system can be operated as a downflow fixed bed reactor during the reaction mode and as an upflow fixed bed reactor during the regeneration mode. In yet other embodiments, variations on the foregoing reactor configurations may be possible.

In certain embodiments, fuel can be added to the air flow to increase the combustion within the catalyst zone 105 during the regeneration mode. A flue gas 138 produced by the combustion during the regeneration process can be emitted from a flue gas outlet located at the top portion 103 of the reactor 102.

As illustrative ranges, during the regeneration mode, the control system 130 may maintain conditions within the reactor whereby a regeneration mode temperature within the reactor is in a range of from 400° C. to 800° C. to facilitate combustion within the reactor. The control system 130 may maintain a regeneration mode pressure within the reactor that is lower than the reaction mode pressure. A lower pressure during the regeneration mode can facilitate expansion of the catalyst bed 106 and removal of particles of impurities from the catalyst bed 106. As an illustrative range, the control system 130 can maintain a regeneration pressure in the reactor 102 from 10 psi to 70 psi, more specifically from 10 psi to 50 psi. Regeneration mode pressure refers to the pressure at the bottom portion 104 of the reactor 102 proximate the air inlet 132. Those of skill in this field will understand that the pressure within the reactor will drop as the air and flue gas flows upward through the catalyst bed 106.

Once the metal oxide catalyst 106 has been regenerated, the control system 130 switches the reactor 102 from the regeneration mode to the reaction mode. Upon switching from regeneration mode to reaction mode, the air flow 130 is turned off and the lipid feedstock flow into the reactor 102 is turned back on for treating the lipid feedstock with the metal oxide catalyst. To further illustrate the alternating of the reaction mode and the regeneration mode, in FIG. 1, the air flow and flue gas flow are shown in broken lines to indicate they are inactive during the reaction mode. In contrast, in FIG. 2, the flow of the lipid feedstock and the treated stream are shown in broken lines to indicate these flows are inactive during the regeneration mode.

The duration of time for which the reactor system operates in each of the reaction mode and the regeneration mode may vary depending upon the operating conditions and the quality of the lipid feedstock. As one example, the reactor system may operate in a reaction mode for a duration of 10 to 30 hours after which the control system 130 switches the reactor system to operate in the regeneration mode for 0.5 to 10 hours. After operating the regeneration mode for a specified time to remove combustible products and impurities from the catalyst bed, the control system can switch the reactor system back to the reaction mode. In certain embodiments, the reactor 102 may be purged, for example with steam, input at the top portion of the reactor after completing a reaction mode operation and before beginning a regeneration mode operation.

While not required, the reactor system 100 can include one or more additional reactors that are similar to the reactor 102 and that can operate in alternating reaction mode and regeneration mode. As with the reactor 102, one or more additional reactors can include a catalyst zone with metal oxide catalyst, a lipid feedstock inlet, and a treated stream outlet. The one or more additional reactors can receive a lipid feedstock treat the lipid feedstock during a reaction mode thereby producing a treated stream similar to the treated stream 120. When coke accumulates on the metal oxide catalyst in the one or more additional reactors, they can switch to regeneration mode. As with reactor 102, when the one or more additional reactors operate in regeneration mode, the lipid feedstock is turned off, an airflow is turned on, and combustion occurs within the reactor to burn coke from the metal oxide catalyst thereby regenerating the catalyst.

Using multiple reactors in the reactor system 100 allows the reactors to operate in an alternating manner so that the reactor system has one reactor operating in reaction mode while another reactor operates in regeneration mode. By operating in this alternating manner, the reactor system can continually produce a treated stream from one of the reactors.

Further details will now be described in connection with the operation of the reactor 102 of reactor system 100. The reactor 102 is typically generally cylindrical in shape and can have various dimensions. A lipid feedstock 112 is directed into the reactor 102 at the lipid feedstock inlet 114.

Optionally, the lipid feedstock 112 can be heated in a pre-heating furnace or a feed-effluent heat exchanger before entering the reactor 102. As an additional option, before introduction into the reactors, the lipid feedstock can be filtered, for example by a mechanical filter, to remove insoluble solids that may interfere with the catalyst reactions.

In alternative example embodiments, the lipid feedstock 112 can be premixed with a steam stream prior to entering the reactor 102 through the lipid feedstock inlet 114. As representative examples of the premix approach, the lipid feedstock comprises a 50 wt. % vapor and 50 wt. % liquid mixture that flows into the fixed bed reactor 102 at a rate of 10,000 bpd (60,750 kg/h), while the steam stream flows into the reactor 102 at a rate of 30,375 kg/h. The resulting lipid steam mixture flowing into the reactor is in a ratio of steam wt. % to lipid wt. % of 0.5 to 1 with a feed temperature of 485° C. and a pressure of 100 psig. The foregoing values for the feed rates, relative proportions, temperature, and pressure are simply representative examples and alternate embodiments encompass ranges of plus or minus 50% of these values.

When referencing the metal oxide catalyst of the catalyst bed 106, it should be understood that it includes an oxide support. Examples of metal oxides and the oxide support for the catalyst were provided above in the description of the treatment of the lipid feedstock. The metal oxide catalyst within the reactor typically has a packed density in the range of 400 to 1000 kg/$m^3$. The catalyst particles are typically spherical or spheroid in shape having a diameter ranging from 1-5 mm. However, in other example embodiments the catalysts particles can have other dimensions and other shapes, such as a droplet shape or a pellet shape.

As provided above in the description of the lipid feedstock treatment, the reaction with the metal oxide catalyst results in a treated stream 120 that has a lower content of oxygen and impurities relative to the lipid feedstock 112 that entered the reactor 102 and a TAN of <5 mg KOH/g. As representative values, the treated stream 120 can exit the reactor 102 at a pressure of about 50 psig and a temperature of about 485° C. The treated stream 120 can be subsequently separated in a separator 122 into several components, including: renewable fuel gas, renewable LPG, a heavy ends product, and a bio-oil renewable feedstock that is suitable for refining into a transportation fuel.

Figure 3:
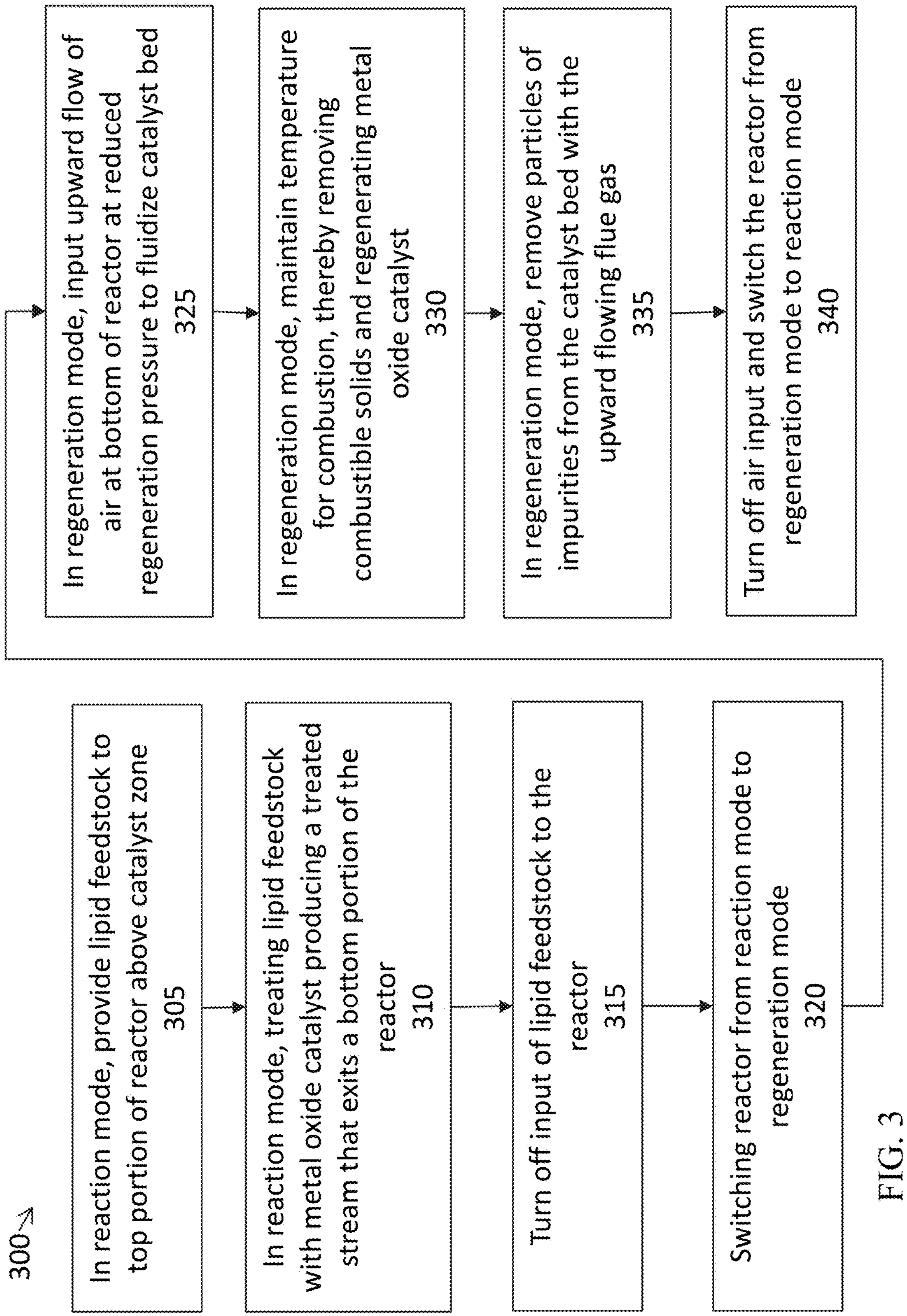
FIG. 3 illustrates a method of operating the reactor of FIGS. 1 and 2 for processing a lipid feedstock in accordance with an example embodiment of the disclosure.

Referring now to FIG. 3, an example process is provided. FIG. 3 illustrates a process 300 by which the example reactor system 100 of FIGS. 1 and 2 operates. Process 300 provides operations 305 and 310 relating to operating in reaction mode when the flow of fluids within the reactor is downward ("downflow"). In contrast, operations 325-335 of process 300 relate to operating in regeneration mode when the flow of fluids within the reactor is upward ("upflow").

Running the reactor in an upflow mode can be useful in mitigating plugging of the reactor in that the upward flow of fluid in the reactor can lift and break apart plugs as they begin to form. However, it has been found that running the reactor in an upflow mode can increase the occurrence of channeling within the reactor, particularly when there is substantial coke formation and substantial deposition of particles of non-volatile impurities. In other words, the upward flow of fluid in the reactor may be ineffective at maintaining a uniform distribution of material in the reactor and, therefore, channeling results. Therefore, operating the reactor in a downflow configuration during reaction mode and in an upflow configuration during regeneration mode further inhibits both the occurrence of plugging and the occurrence of channeling.

Process 300 of FIG. 3 inhibits plugging and channeling in the reactor by combining: (a) combustion of accumulated combustible solids (coke), (b) modulating pressure within the reactor during the reaction mode and the regeneration mode, and (c) alternating the fluid flow within the reactor between a downflow configuration (in reaction mode) and an upflow configuration (in regeneration mode). However, the operations of example process 300 are illustrative examples and in other embodiments the operations of process 300 can be modified.

Referring to operation 305 of process 300, the control system 130 is operating the reactor 102 in the reaction mode and a lipid feedstock 112 is provided at a top portion 103 of the reactor 102. The lipid feedstock 112 enters the reactor 102 above the catalyst zone 105 and flows downward through the catalyst zone 105. The downward flow of the lipid feedstock 112 inhibits plugging and channeling in the catalyst bed. The lipid feedstock can be dispersed across the reactor using a distributor tray.

Continuing in the reactor mode, in operation 310, the lipid feedstock 112 reacts with the metal oxide catalyst as it flows downward through the catalyst zone 105. The treating conditions within the reactor 102 include maintaining a pressure within the reactor in a range of 30 psi to 1,450 psi, which can be referred to as the reaction mode pressure. Preferably, the reaction mode pressure within the reactor is maintained within the range of 100 psi to 500 psi, and more preferably within the range of 100 psi to 200 psi. It has been found that maintaining a reaction mode pressure within the reactor of at least 100 psi reduces pressure drops within the reactor and, thereby, reduces the occurrence of channeling within the reactor. Inhibiting channeling results in a more uniform flow of fluid within the reactor which improves the performance of the reactor. Maintaining the reaction mode pressure in the aforementioned ranges also provides an additional benefit in that it can facilitate condensation of LPG range hydrocarbons (C3-C4) using cooling water as a coolant.

The treating conditions within the ketopyrolysis zone of the reactor can further include maintaining a temperature in the range of 400° C. to 600° C., and more preferably in the range of 450° C. to 550° C. Treating the lipid feedstock 112 with the metal oxide catalyst produces a treated stream. The treated stream exits through an outlet at the bottom portion 104 of the reactor 102. The treated stream includes a condensable oil fraction that is subsequently condensed to obtain a bio-oil renewable feedstock that is suitable for refining into a transportation fuel.

In certain embodiments, the treated stream can also comprise a renewable fuel gas, renewable LPG, and a "heavy ends" product having a boiling point greater than 360° C., which is too high to be used as a transportation fuel. This heavy ends product of the treated stream can be used: a) in the production of renewable base oil for lubricants applications, b) in a hydrocracker where it is processed into a product with a boiling temperature in the transportation fuel range, or c) it can be recycled and returned with the lipid feedstock to the fixed bed reactor where it will be thermally cracked into additional fuel range products.

As explained previously, after a period of time operating in reaction mode, coke and impurities accumulate on the metal oxide catalyst inhibiting treatment of the lipid feedstock. In order to regenerate the catalyst, in operation 315, the control system 130 turns off the flow of the lipid feedstock to the reactor. In operation 320, the control system switches the reactor 120 from reaction mode to regeneration mode in order to remove the coke and impurities thereby regenerating the metal oxide catalyst. Optionally, the control system 130 may purge the reactor 120 with steam or inert gas before introducing air to the reactor in association with the regeneration mode.

In regeneration mode, fluid flows within the reactor in an upflow configuration. The upflow configuration assists in loosening the catalyst and removing particles of non-volatile impurities from the catalyst. In operation 325, a flow of air is provided at the bottom portion of the reactor and the air flows upward through the reactor to facilitate combustion. Additionally, the control system 130 can reduce the pressure within the reactor from the reaction mode pressure to a regeneration mode pressure. The reduced pressure can be achieved by controlling the flow of air into the reactor. The regeneration mode pressure can be in a range of 10 psi to 70 psi. Preferably, the regeneration mode pressure within the reactor is maintained within the range of 10 psi to 50 psi and, more preferably within the range of 10 psi to 20 psi. It has been found that maintaining a regeneration mode pressure within these ranges facilitates the regeneration process while maintaining the catalyst bed in an expanded state or a fluidized state.

In operation 330, the control system 130 maintains a temperature in the reactor to facilitate combustion and the combustion process removes the coke thereby regenerating the metal oxide catalyst. In operation 335, flue gas produced from the combustion of the coke flows upward and out of the fixed bed reactor. Beneficially, the flue gas also carries with it particles of the non-volatile impurities within the reactor that do not burn off with the coke. Maintaining the regeneration mode pressure (reduced from the reaction mode pressure) facilitates the removal of the non-volatile impurities with the flue gas in that the reduced pressure loosens and fluidizes the catalyst bed, thereby shaking loose the particles of non-volatile impurities so they can be carried away by the flue gas. Thus, the regeneration of the reactor is facilitated by maintaining the reduced regeneration mode pressure.

When the combustion of the coke is complete, the control system 130 turns off the air flow to the reactor and the reactor is switched from regeneration mode back to reaction mode in operation 340. The reactor can resume the reaction mode operations beginning again with operation 305.

For any figure shown and described herein, one or more of the components may be omitted, added, repeated, and/or substituted. Additionally, it should be understood that in certain cases components of the example systems can be combined or can be separated into subcomponents. Accordingly, embodiments shown in a particular figure should not be considered limited to the specific arrangements of components shown in such figure. Further, if a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure.

With respect to the example methods described herein, it should be understood that in alternate embodiments, certain steps of the methods may be performed in a different order, may be performed in parallel, or may be omitted. Moreover, in alternate embodiments additional steps may be added to the example methods described herein. Accordingly, the example methods provided herein should be viewed as illustrative and not limiting of the disclosure.

Terms such as "first", "second", "top", "bottom", "side", "distal", "proximal", and "within" are used merely to distinguish one component (or part of a component or state of a component) from another. Such terms are not meant to denote a preference or a particular orientation unless so indicated by the context, and are not meant to limit the embodiments described herein. In the example embodiments described herein, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The terms "a", "an", and "the" are intended to include plural alternatives, e.g., at least one. The terms "including", "with", and "having", as used herein, are defined as comprising (i.e., open language), unless specified otherwise.

When Applicant discloses or claims a range of any type, Applicant's intent is to disclose or claim individually each possible number that such a range could reasonably encompass, including end points of the range as well as any sub-ranges and combinations of sub-ranges encompassed therein, unless otherwise specified. Numerical end points of ranges disclosed herein are approximate, unless excluded by proviso.

Values, ranges, or features may be expressed herein as "about", from "about" one particular value, and/or to "about" another particular value. When such values, or ranges are expressed, other embodiments disclosed include the specific value recited, from the one particular value, and/or to the other particular value. Similarly, when values are expressed as approximations, by use of the antecedent "about," it will be understood that the particular value forms another embodiment. It will be further understood that there are a number of values disclosed therein, and that each value is also herein disclosed as "about" that particular value in addition to the value itself. In another aspect, use of the term "about" means ±20% of the stated value, ±15% of the stated value, ±10% of the stated value, ±5% of the stated value, ±3% of the stated value, or ±1% of the stated value.

Although embodiments described herein are made with reference to example embodiments, it should be appreciated by those skilled in the art that various modifications are well within the scope of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A reactor system for converting a lipid feedstock to a treated stream wherein the treated stream comprises a condensable oil fraction having a lower content of oxygen and impurities than the lipid feedstock, wherein the reactor system operates alternating between a reaction mode and a regeneration mode, the reactor system comprising:

a reactor having a top portion and a bottom portion and configured to contain at least one bed of catalyst particles comprising a metal oxide on an oxide support;

a lipid feedstock inlet in the top portion of the reactor for feeding the lipid feedstock in a downward flow and an outlet in the bottom portion of the reactor for removing the treated stream when operating in the reaction mode;

a temperature control for operating the reactor at a reaction mode temperature of from 450° C. to 550° C. and a regeneration mode temperature of from 400° C. to 800° C., the regeneration mode temperature causing combustion of combustible solids on the catalyst particles thereby regenerating the catalyst particles;

a pressure control for operating the reactor at a reaction mode pressure of from 30 psi to 1,450 psi and a regeneration mode pressure of from 10 psi to 200 psi;

an inlet in the bottom portion of the reactor for providing air in an upward flow;

an outlet in the top portion of the reactor for removing flue gas from the combustion when operating in the regeneration mode, and a fractionator to fractionate the treated stream after it leaves the reactor to obtain a gaseous fraction and a liquid fraction, wherein the liquid fraction comprises a bio-oil having a lower oxygen content when compared to the lipid feedstock.

2. The reactor system of claim 1, wherein the condensable oil fraction of the treated stream has an oxygen content of 10% to 40% of the oxygen content of the lipid feedstock.

3. The reactor system of claim 1, wherein the lipid feedstock contains 20 ppm to 200 ppm of the impurities, wherein the impurities are selected from the group consisting of metals, phosphorous, chloride and combinations thereof, and the condensable oil fraction of the treated stream contains 0.1 ppm to 5 ppm of the impurities selected from the group consisting of metals, phosphorous, chloride and combinations thereof.

4. The reactor system of claim 3, wherein the condensable oil fraction of the treated stream contains 0.1 ppm to 2 ppm chloride.

5. The reactor system of claim 1, wherein, during the regeneration mode, an air flow rate up through the at least one bed of catalyst particles exceeds a minimum fluidization velocity to cause the at least one bed of catalyst particles to expand, thereby loosening dust particles and facilitating their ejection from the reactor with the flue gas.

6. The reactor system of claim 5, wherein the at least one bed of catalyst particles is fluidized during the regeneration mode for at least a portion of the regeneration mode.

7. The reactor system of claim 1, wherein the reaction mode pressure within the reactor is from 100 psi to 500 psi and the regeneration mode pressure within the reactor is from 10 psi to 50 psi.

8. The reactor system of claim 7, wherein the regeneration mode pressure within the reactor is 10 psi to 20 psi.

9. A reactor system for converting a lipid feedstock to a treated stream wherein the treated stream comprises a condensable oil fraction having a lower content of oxygen and impurities than the lipid feedstock, wherein the reactor system operates alternating between a reaction mode and a regeneration mode, the reactor system comprising:

a reactor having a top portion and a bottom portion and configured to contain at least one bed of catalyst particles comprising a metal oxide on an oxide support;

a lipid feedstock inlet in the top portion of the reactor for feeding the lipid feedstock in a downward flow and an outlet in the bottom portion of the reactor for removing the treated stream when operating in the reaction mode;

a control system for alternating the reactor between a reaction mode and a regeneration mode, the control system comprising a temperature control and a pressure control, the temperature control for operating the reactor at a reaction mode temperature of from 450° C. to 550° C. and a regeneration mode temperature of from 400° C. to 800° C., the regeneration mode temperature causing combustion of combustible solids on the catalyst particles thereby regenerating the catalyst particles;

the pressure control for operating the reactor at a reaction mode pressure of from 30 psi to 1,450 psi and a regeneration mode pressure of from 10 psi to 200 psi;

an inlet in the bottom portion of the reactor for providing air in an upward flow; and an outlet in the top portion of the reactor for removing flue gas from the combustion when operating in the regeneration mode, the control system configured to purge the reactor with steam or inert gas provided into the top portion of the reactor after discontinuing the operation of the reactor in the reaction mode and before commencing operation of the reactor in the regeneration mode.

10. The reactor system of claim 1, wherein the reactor is purged with steam or inert gas after operation in the regeneration mode and before operation in the reaction mode.

11. A reactor system for converting a lipid feedstock to a treated stream wherein the treated stream comprises a condensable oil fraction having a lower content of oxygen and impurities than the lipid feedstock, wherein the reactor system operates alternating between a reaction mode and a regeneration mode, the reactor system comprising:

a reactor having a top portion and a bottom portion and configured to contain at least one bed of catalyst particles comprising a metal oxide on an oxide support;

a lipid feedstock inlet in the top portion of the reactor for feeding the lipid feedstock in a downward flow and an outlet in the bottom portion of the reactor for removing the treated stream when operating in the reaction mode;

a temperature control for operating the reactor at a reaction mode temperature of from 450° C. to 550° C. and a regeneration mode temperature of from 400° C. to 800° C., the regeneration mode temperature causing combustion of combustible solids on the catalyst particles thereby regenerating the catalyst particles;

a pressure control for operating the reactor at a reaction mode pressure of from 30 psi to 1,450 psi and a regeneration mode pressure of from 10 psi to 200 psi;

an inlet in the bottom portion of the reactor for providing air in an upward flow; and an outlet in the top portion of the reactor for removing flue gas from the combustion when operating in the regeneration mode, wherein the lipid feedstock comprises at least one fatty acid glycerol ester.

12. The reactor system of claim 1, wherein the reactor operates in the reaction mode for 10 to 30 hours and the reactor operates in the regeneration mode for 0.5 to 10 hours.

13. The reactor system of claim 1, wherein the flue gas contains metal constituents present in the lipid feedstock.

14. The reactor system of claim 5, wherein dust particles in the flue gas have a particle size of 5 microns to 100 microns.

* * * * *